(12) United States Patent
Pantelias et al.

(10) Patent No.: US 9,237,030 B2
(45) Date of Patent: Jan. 12, 2016

(54) SOLUTIONS FOR UPSTREAM CHANNEL BONDING

(75) Inventors: Niki Pantelias, Duluth, GA (US); Lisa Denney, Suwanee, GA (US); Edward Boyd, Petaluma, CA (US); Andres Alvarez, Suwanee, GA (US); Scott Hollums, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 402 days.

(21) Appl. No.: 13/589,444

(22) Filed: Aug. 20, 2012

(65) Prior Publication Data

US 2013/0051443 A1   Feb. 28, 2013

Related U.S. Application Data

(60) Provisional application No. 61/526,504, filed on Aug. 23, 2011, provisional application No. 61/583,543, filed on Jan. 5, 2012.

(51) Int. Cl.
*H04L 12/28* (2006.01)

(52) U.S. Cl.
CPC ........ *H04L 12/2801* (2013.01); *H04L 12/2869* (2013.01); *H04L 12/2898* (2013.01)

(58) Field of Classification Search
None
See application file for complete search history.

(56) References Cited

U.S. PATENT DOCUMENTS

| | | | |
|---|---|---|---|
| 7,898,967 B2 | 3/2011 | Pantelias et al. | |
| 8,098,685 B2 | 1/2012 | Jung et al. | |
| 2001/0053152 A1 | 12/2001 | Sala et al. | |
| 2005/0063391 A1* | 3/2005 | Pedersen | 370/395.21 |
| 2009/0034526 A1* | 2/2009 | Ahmadi et al. | 370/392 |
| 2009/0135850 A1 | 5/2009 | Hong et al. | |
| 2009/0249417 A1 | 10/2009 | Goguen et al. | |
| 2010/0172368 A1 | 7/2010 | Eng | |

FOREIGN PATENT DOCUMENTS

| | | |
|---|---|---|
| EP | 1 705 838 A1 | 9/2006 |
| KR | 10-2009-0054684 A | 6/2009 |
| KR | 10-2010-0058169 A | 6/2010 |
| TW | 200807959 A | 2/2008 |

OTHER PUBLICATIONS

Partial European Search Report, mailed Dec. 20, 2012, for European Patent Appl. No. 12005973.8, 7 pages.

*Access, Terminals, Transmission and Multiplexing (ATTM); Third Generation Transmission Systems for Interactive Cable Television Services—IP Cable Modems; Part 4: MAC and Upper Layer Protocols; DOCSIS3.0*, Draft ETSI EN 302 878-4, V1.1.0 (Apr. 2011), 648 pages, Apr. 1, 2011.

(Continued)

*Primary Examiner* — Alex Skripnikov

(74) *Attorney, Agent, or Firm* — Sterne, Kessler, Goldstein & Fox PLLC

(57) ABSTRACT

A cable modem that supports stateless requesting and/or limited contention-based requesting is provided herein. In an example, a physical layer (PHY) configured to communicate over a plurality of upstream channels is provided. A bandwidth requester is provided to request bandwidth using contention-based requesting over a first subset of the upstream channels for contention-based flows and request bandwidth using stateless requesting over a second subset of the upstream channels for stateless flows.

20 Claims, 11 Drawing Sheets

(56) References Cited

OTHER PUBLICATIONS

*Data-Over-Cable Service Interface Specifications DOCSIS 3.0: MAC and Upper Layer Protocols Interface Specification*, Copyright 2006-2011Cable Television Laboratories, Inc., entire document (768 total pages).

Office Action directed to related Taiwanese Patent Application No. 101130393, mailed Sep. 22, 2014; 6 pages.

Heyaime-Duvergé, César and Prabhu, Vasant K., "Statistical Multiplexing of Upstream Transmissions in DOCSIS Cable Networks," *IEEE Transactions on Broadcasting*, vol. 56, No. 3, Sep. 2010, pp. 296-310.

Martin, Jim et al., "Cable Modem Buffer Management in DOCSIS Networks," *IEEE Sarnoff Symposium*, Apr. 12, 2010, 6 pages.

European Search Report for EP Appl. No. 13004205.4, dated Jun. 25, 2014, 4 pages.

Office Action, dated Oct. 20, 2014, for Chinese Patent Appl. No. 201210304164.4, 2 pages.

Office Action, dated Mar. 11, 2015, for Chinese Patent Appl. No. 201210304164.4, 3 pages.

European Search Report, dated Apr. 8, 2013, for European Patent Appl. No. 12005973.8, 6 pages.

Communication pursuant to Article 94(3) EPC, dated Apr. 19, 2013, for European Patent Appl. No. 12005973.8, 8 pages.

Communication pursuant to Article 94(3) EPC, dated Jul. 7, 2014, for European Patent Appl. No. 13004205.4, 7 pages.

Office Action, dated Oct. 22, 2013, for Korean Patent Appl. No. 10-2012-0092324, 4 pages.

\* cited by examiner

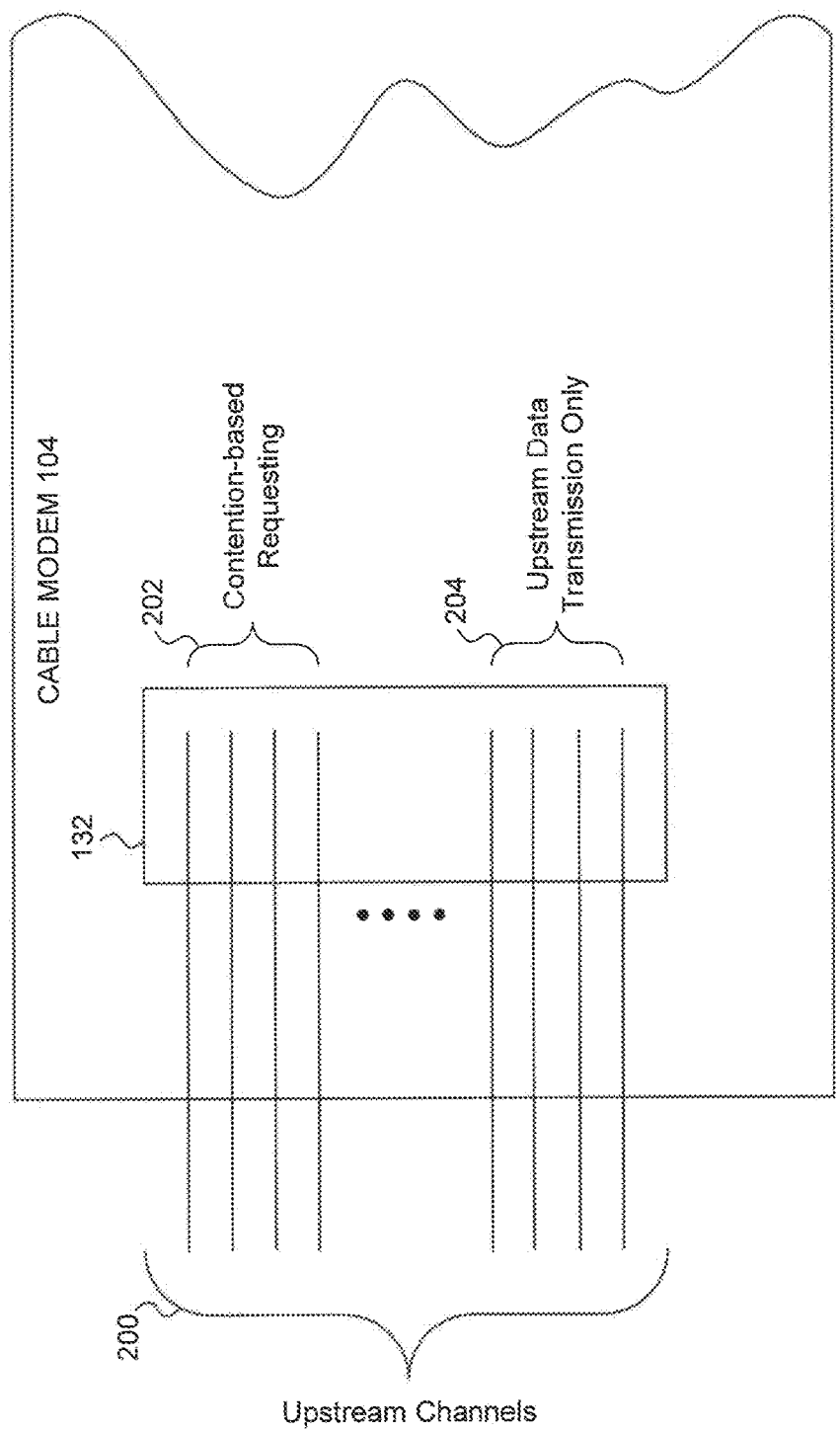

SOLUTIONS FOR UPSTREAM CHANNEL BONDING

CROSS-REFERENCE TO RELATED APPLICATIONS

This application claims the benefit of U.S. Provisional Application No. 61/526,504, filed Aug. 23, 2011, and U.S. Provisional Application No. 61/583,543, filed on Jan. 5, 2012, each of which are incorporated herein by reference in their entirety.

BACKGROUND OF THE INVENTION

1. Field of the Invention

The invention is generally relates to upstream channel bonding.

2. Background Art

Cable television (CATV) systems are no longer limited to only providing television programs to viewers. In addition, CATV systems provide internet access, and/or other services to consumers via signals transmitted to customer premises by optical fibers, coaxial and other cables, such as Wi-Fi, Bluetooth®, etc., all in contrast to traditional over-the-air radio wave broadcasting of television programming.

The CATV system may utilize Data Over Cable Service Interface Specification (DOCSIS) compliant equipment and protocols to carry out a transfer of information, such as video, audio, and/or data between one or more set-top devices and one or more cable modem termination systems (CMTS). The DOCSIS Specification generally refers to a group of specifications published by CableLabs® that define industry standards for CMTS, cable modems (CMs) and control for set-top devices. In part, the DOCSIS specification sets forth requirements and objectives for various aspects of cable modem systems including, but not limited to, operations support systems, management, data interfaces, network layer, data link layer, and physical layer transport for data over cable systems. The DOCSIS interface specification entitled "Data-Over-Cable Service Interface Specifications, DOCSIS 3.0, MAC and Upper Layer Protocols Interface Specification, CM-SP-MULPIv3.0416-110623" is incorporated by reference herein in its entirety.

A DOCSIS cable system includes two primary components: one or more cable modems at a customer premises, and a CMTS located at a headend. As used herein, the term "downstream" refers to the transfer of information in a direction from the CMTS to the cable modems. The term "upstream" refers to the transfer of information in a direction from cable modems to the CMTS.

As the number of upstream channels for a cable modem increases, the complexity of upstream channel bonding increases exponentially. For each channel added to an upstream bonded channel group, monitoring and tracking functions performed by a cable modem for each additional upstream channel increases as well. For example, for each upstream channel, a cable modem has to store and monitor the time of a request for bandwidth, how much bandwidth is requested, which upstream channel the bandwidth is requested on, how much bandwidth was granted, a time at which a bandwidth grant was received and on which downstream channel the grant was received on. Thus, increased hardware and software complexity is required of the cable modem to store and monitor bandwidth requests as more upstream channels are added.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 2A illustrates an example of limited contention-based requesting.

The present invention will now be described with reference to the accompanying drawings. In the drawings, like reference numbers may indicate identical or functionally similar elements.

DETAILED DESCRIPTION OF THE INVENTION

While the present invention is described herein with reference to illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

Figure 1A:
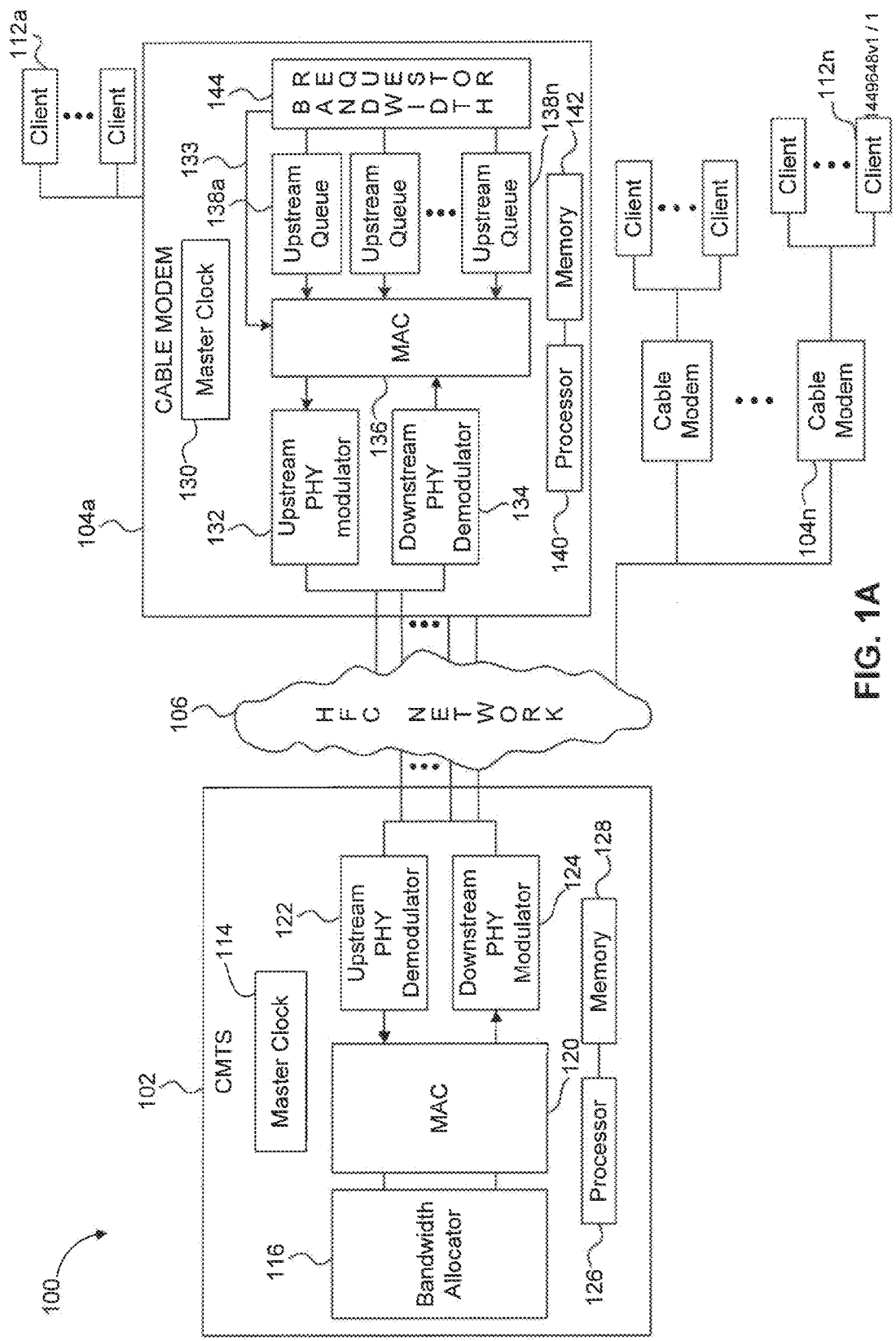
FIG. 1A illustrates an example system according to an embodiment of the disclosure.

FIG. 1A illustrates an example system 100 according to an embodiment of the disclosure. System 100 includes a headend or cable modem termination system 102 coupled to one or more cable modems 104a-n via HFC network 106. Each cable modem 104 may be connected or coupled to one or more client devices 112a-n. For ease of illustration, cable modem 104a is shown in greater detail than the other cable modems.

Cable modem 104 may include a master clock 130, an upstream physical layer modulator (US PHY) 132, a downstream physical layer demodulator (DS PHY) 134. The US PHY 132 and the DS PHY 134 are coupled to Media Access Control (MAC) 136. MAC 136 is coupled to upstream queues 138a-n. Upstream queues 138 store data for upstream transmission to CMTS 102. Bandwidth requestor 144 is coupled to upstream queues 138. Cable modem 104 also includes a processor 140 coupled to a memory 142. According to an embodiment of the disclosure, the functions described herein as performed by cable modem 104 may be performed by processor 140 based on instructions stored in memory 142.

Cable modem 104 is coupled to HFC network 106 using coaxial cable. While the embodiments described herein utilize a HFC network and coaxial cable, other methods of transmission may include, but are not limited to, wired, wireless, or both transmission media, including satellite, terrestrial (e.g., fiber optic, copper, twisted pair, coaxial, hybrid fiber-coaxial (HFC), or the like), radio, microwave, free-space optics, and/or any other form or method of transmission.

US PHY 132 forms the physical layer interface between a cable modem 104 and the upstream channels of HFC network 106. Cable modem 104 may include a separate US PHY 132 for each one of the upstream channels. Video, voice, data and/or control messages that are destined for CMTS 102 are collected at US PHY 132 and transmitted to CMTS 102. US PHY 132 modulates and/or formats the information for upstream transmission to CMTS 102

DS PHY 134 forms the physical layer interface between cable modem 104 and the downstream channel(s) of HFC network 106. DS PHY 134 receives and demodulates all bursts from CMTS 102.

The frequency spectrum available for use by the system 100 for communication may be partitioned into "channels." As used herein, the term "downstream channels" refers to the channels over which data is transferred from the CMTS 102 to the cable modems 104. The term "upstream channels" refers to the channels over which data is transferred from the cable modems 104 to the CMTS 102.

MAC 136 receives downstream signals from DS PHY 134 and provides upstream signals to US PHY 132, as appropriate. MAC 136 operates as the lower sublayer of the data link layer for cable modem 104. In embodiments, MAC 136 supports fragmentation, concatenation, payload header suppression/expansion, and/or error checking for signals transported over the physical layer.

Memory 142 may interact with MAC 136 to store the signals as they are processed by MAC 136. Memory 142 may also store various auxiliary data used to support the processing activities. Such auxiliary data includes security protocols, identifiers, rules, policies etc.

Bandwidth requestor 144 requests bandwidth from CMTS 102 based on an amount of data in upstream queues 138, a Quality of Service (QoS) for upstream flows and a service level agreement (SLA) for a client 112. QoS comprises requirements on aspects of a connection between a cable modem 104 and CMTS 102, such as service response time, loss, signal-to-noise ratio, cross-talk, echo, interrupts, frequency response, loudness levels etc. The SLA may specify the levels of availability, serviceability, performance, operation, or other attributes of a service provided by CMTS 102 to a cable modem 104, such as billing. In an example, bandwidth requestor 144 generates a signal 133 that indicates a queue depth of a queue 138 to MAC 136. The queue depth indicates an amount of data in an upstream queue 138 for transmission to CMTS 102. MAC 136 prepares a request for bandwidth based on the queue depth.

Cable modem termination system (CMTS) 102 includes a master clock 114, an upstream PHY demodulator 122, a downstream PHY modulator 124 and a MAC 120. MAC 120 is coupled to a bandwidth allocator 116. CMTS 102 also includes a processor 126 coupled to a memory 128. According to an embodiment of the disclosure, the functions described herein as performed by CMTS 102 may be performed by processor 126 based on instructions stored in memory 128.

CMTS 102 is also coupled to cable modems 104 via HFC network 106.

US PHY 122 forms the physical layer interface between CMTS 102 and the upstream channels of HFC network 106. CMTS 102 may include a separate US PHY 122 for each one of the upstream channels. US PHY 122 receives and demodulates all bursts from cable modems 104.

DS PHY 124 forms the physical layer interface between CMTS 102 and the downstream channel(s) of HFC network 106. Video, voice, data and/or control messages that are destined for one or more cable modems 104 are collected at DS PHY 124 and transmitted to the respective cable modems 104. DS PHY 124 modulates and/or formats the information for downstream transmission.

MAC 120 receives the upstream signals from US PHY 122 and provides the downstream signals to DS PHY 124, as appropriate. MAC 120 operates as the lower sublayer of the data link layer of CMTS 102. In embodiments, MAC 120 supports fragmentation, concatenation, payload header suppression/expansion, and/or error checking for signals transported over the physical layer.

Memory 128 may interact with MAC 120 to store the signals as they are processed by MAC 120. Memory 128 may also store various auxiliary data used to support the processing activities. Such auxiliary data includes security protocols, identifiers, rules, policies etc.

Bandwidth allocator 116 may allocate bandwidth to a cable modem 104 based on the bandwidth request generated by bandwidth requestor 144 of a cable modem 104. In an example, as will be described further below, bandwidth allocator 116 may also store a state for upstream channels of a cable modem 104. The bandwidth allocator 116 grants bandwidth in the form of a "grant" which is a MAP message that comes in on downstream channels via DS PHY 124.

In an example, a client 112 may be any wired or wireless device including but not limited to a personal computer, a laptop computer, a cellphone, personal digital assistant (PDA) or a media player such as an iPod™ or iPad™.

As the number of upstream channels for a cable modem 104 increases, the corresponding complexity of upstream channel bonding increases. "Upstream channel bonding" allows cable operators to offer higher upstream bandwidth per cable modem by combining multiple channels to form a larger bonding group at the MAC layer. Each channel added to an upstream bonded channel exponentially increases required monitoring and tracking functions performed by a cable modem. For example, for each upstream channel, a cable modem has to store and monitor the time of request, how much bandwidth is requested, which channel the bandwidth is requested on, how much bandwidth was granted, a time at which a bandwidth grant was received and which channel it was received on. Thus, increased hardware and software complexity is required of the cable modem to store and monitor bandwidth requests as more upstream channels are added.

In a conventional DOCSIS systems, conventional cable modems are in charge of managing upstream bonding via state-based processes defined in DOCSIS 3.0. Such management obligations cause a scalability problem in that hardware/software obligations scale exponentially as each channel is added. Although downstream bonding by CMTS scales easily as more downstream channels are added, upstream bonding is much more complex than downstream channel bonding by a CMTS because every channel added increases complexity factorially. For example, in the downstream direction, channel bonding is a relatively straightforward exercise in statistical multiplexing with the CMTS being entirely in control. As such, the CMTS may transmit different packets for a cable modem on different channels at the same time, over overlapping times, or at different times. In the upstream direction, however, the CMTS does not know which cable modem wants to transmit, when the cable modem will transmit or how much data each cable modem will transmit. Therefore, each cable modem must request and get permission to transmit at certain instances in time known as "time slots." Complicating matters further, there may be a mix of bonded and non-bonded channels present.

In conventional DOCSIS systems, "state-based," bandwidth requesting mechanisms are used by a conventional cable modem. In "state-based" requesting as referred to herein, a conventional cable modem may send a request for bandwidth to the CMTS during contention time slots defined by the CMTS. Furthermore, the cable modem may have to maintain a "state cycle" or a "request-acknowledgement state cycle" (described below) for each upstream queue. In DOCSIS, each queue is associated with an upstream Service Flow. In addition or complementary to the state cycle, the cable modem may also store for each upstream Service Flow that implements state-based requesting, per channel utilized by that service flow: a time at which a bandwidth request is sent, how much bandwidth is requested, which channel bandwidth is requested on, how much bandwidth is granted, a time at which a bandwidth grant is received and which channel the grant is received on.

Figure 1B:
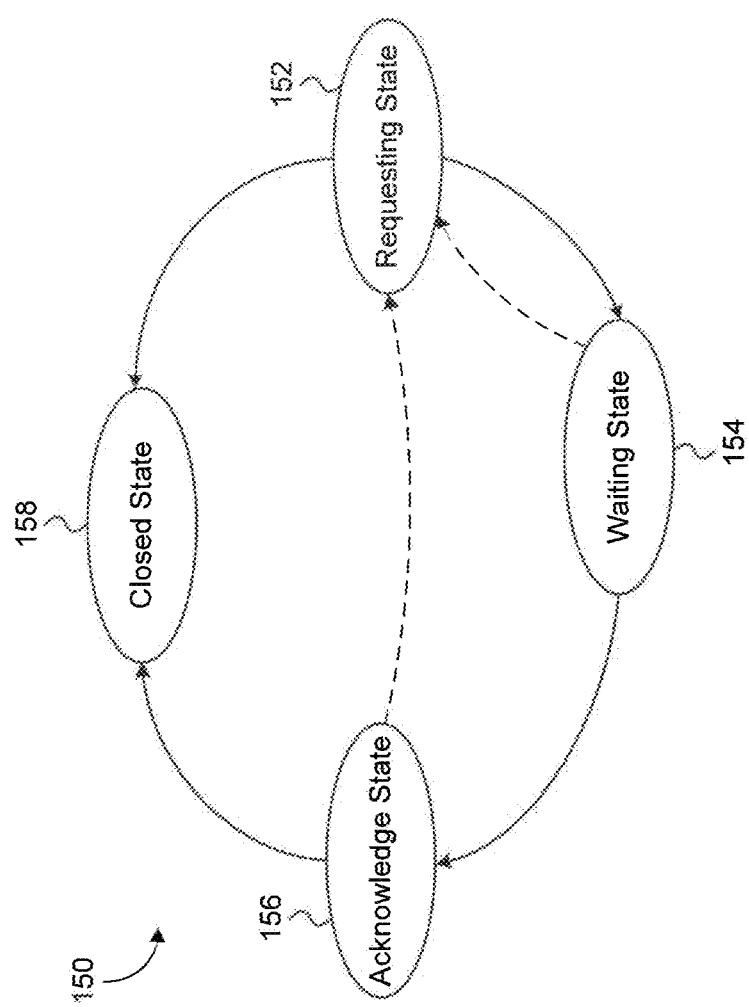
FIG. 1B illustrates an exemplary state cycle according to an embodiment of the disclosure.

FIG. 1B illustrates an exemplary state cycle 150 according to an embodiment of the disclosure. In an example, a cable modem may operate in one or more of four states, namely requesting state 152, waiting state 154, acknowledge state 156 and closed state 158. Requesting state 152 indicates that bandwidth requestor 144 is requesting bandwidth from CMTS. Once the request has been transmitted, a cable modem enters waiting state 154 until feedback (such as a grant or an acknowledge "ack" message) is received from the CMTS. Acknowledge state 156 indicates that either the CMTS has received the request or the cable modem has received a corresponding grant. If the cable modem remains in acknowledge state 156 or waiting state 154 beyond a predetermined period of time, the cable modem generates another request by re-entering requesting state 152. In other words, if the cable modem does not receive an acknowledgment message or grant message within a predetermined period of time, then the cable modem will generate another request.

After all requests have been granted or there are no other pending or outstanding requests, cable modem 104 enters the closed state 158. Closed state 158 indicates that either there is no more data for transmission, all requests have been granted or are bandwidth is no longer required. When bandwidth is needed again, the state cycle 150 enters the requesting state 152 again.

Thus, in a state-based requesting mode, a cable modem 102 has to store, for example in memory 142, and maintain/update a state cycle 150 for each upstream channel.

The complexity of maintaining state cycle 150 increases when fragments of a packet are transmitted in a different order because of upstream bonding channel characteristics. Another problem arises in managing schedulers (not shown) across all upstream channels of a cable modem 104. In a state-based request system, acknowledgement (ACK) time has to be tracked by the cable modem 104. The ACK time includes ACK processed and ACK pending timeout time for each upstream channel of a cable modem 104. A request may be made by a cable modem 104 on a particular upstream channel, however a grant from the CMTS 102 may come down on any channel thereby adding to the complexity of tracking grants. Further complicating the grant tracking process, a bandwidth grant can be a subset or a concatenation of grants for multiple requests. Thus, as the number of upstream channels for a cable modem 104 increases, the amount of data that needs to be stored and tracked per channel increases as a factorial of the number of upstream channels.

DOCSIS upstream channel bonding, which is typically across up to 4 channels, is being expanded to upwards of 8 channels. However, it is hard to scale DOCSIS upstream bonding to large numbers of channels such as 32 or 48 channels. One particular difficulty lies in the request-grant tracking methods used in DOCSIS. DOCSIS implements contention requesting—i.e. there are time slots in the upstream where any of a number of cable modems 104, possibly including all cable modems 104, could attempt to send a request for bandwidth to CMTS 102. These requests could collide so that CMTS 102 does not receive the requests. In order to minimize collisions, there are rules about when a cable modem 104 can attempt a transmission during a contention time slot. A "contention time slot" refers to a period of time allotted by CMTS 102 during which any cable modem 104 can request bandwidth from the CMTS 102. DOCSIS provides a set of rules including backoff algorithms in the event requests collide. In order for backoff algorithms and other rules to work, a cable modem 104 should have a way of determining whether its request was received by the CMTS or not. If the request was received, the cable modem isn't allowed to re-request bandwidth, but if the request was not received, the cable modem may retry requesting bandwidth from the CMTS. There is a very complex structure of DOCSIS messages and rules with regards to ACK times, grants pending etc. that are used to determine whether a request is received or not by CMTS 102. In DOCSIS 3.0, the complexity of implementing all of these structures/rules/etc. grows much faster than the number of channels, because each channel needs information about request times and ACK times on every other channel. For every channel over which a service flow can send a contention-based request for bandwidth, the cable modem has to calculate and store "contention-based data." Contention-based data as referred to herein may be calculated, for example, by adding together back-off windows, multiplying the back-off windows by a variable, picking a random number (x) in a range, and counting off x many request opportunities across all channels associated with a service flow. Therefore, implementing contention-based requesting on each new channel that is added may involve calculating and maintaining contention-based data for each new channel thereby increasing the complexity significantly. The DOCSIS interface specification, which is incorporated above by reference, provides further examples and details on contention-based data associated with contention-based requests in, for example, section 7.2.2.

Limited Contention-Based Requesting

To overcome the problems described above, according to an embodiment of the disclosure, a cable modem 104 may implement "limited contention-based requesting" which refers to limiting a number of channels on which contention-based requests for bandwidth occurs, thereby requiring state to be stored and maintained for only contention-based channels. Both channels that are not used for contention-based requesting and those that are used for contention-based requesting can be used for transmitting data upstream to CMTS 102.

FIG. 2A illustrates an example of limited contention-based requesting. As shown in FIG. 2A, upstream PHY 132 transmits information to CMTS 102 over upstream channels 200. Upstream channels 200 include a first subset of upstream channels 202 and a second subset of upstream channels 204.

Referring back to FIG. 1, in limited contention-based requesting, bandwidth requestor 144 requests bandwidth during contention slots on only the first subset of the upstream channels 202. The PHY 132 can transmit data over both the first subset 202 and the second subset of upstream channels 204, but only uses the first subset of upstream channels 202 for contention-based requesting and not the second subset of upstream channels 204 for contention-based requesting. By limiting a number of upstream channels on which contention-based requesting occurs, contention-based data has to be maintained only for channels 202 thereby reducing the amount of memory 142 and the amount of processing required by processor 140. State-based data, for example state cycle 150, still has to be maintained for each upstream channel 200. As described above, upstream data can be transmitted on both the first subset of upstream channels 202 and the second subset of upstream channels 204, but contention-based requesting is limited to the first subset of upstream channels 202.

By limiting the number of contention-based requesting to a subset of channels 202, any number of non-contention-based channels, such as channels 204, could be provided with less increase in complexity since channels 204 have less overhead when compared to channels 202. Unicast request opportunities could appear on any upstream channel, and grants in response to any type of request (contention or otherwise) could appear on any downstream channel. Thus the total capacity of the system can be scaled up to a large number of channels without increasing the complexity of contention-based tracking beyond that needed for channels 202.

In an example, a cable modem 104 may keep track of when contention opportunities exist and count them across all upstream channels 200 at the same time. CMTS 102 puts contention requesting opportunities on every upstream channel 200. The provisioning of cable modem 104 determines which upstream channels 200 are used by this particular cable modem to respond to the contention opportunities. Provisioning of cable modem 104 could be done via a DOCSIS configuration file, DOCSIS MAC Management Messages from the CMTS, Simple Network Management Protocol (SNMP) commands from a network management system, or other means. In limited contention-based requesting, a cable modem keeps track of when it made a request for bandwidth on one of the upstream channels 202 and shares that information with other upstream channels 204. A cable modem 102 may be provisioned by, for example CMTS 102, to use some upstream channels 202 for contention-based requesting and the remaining channels 204 are not used for contention requesting.

Figure 2B:
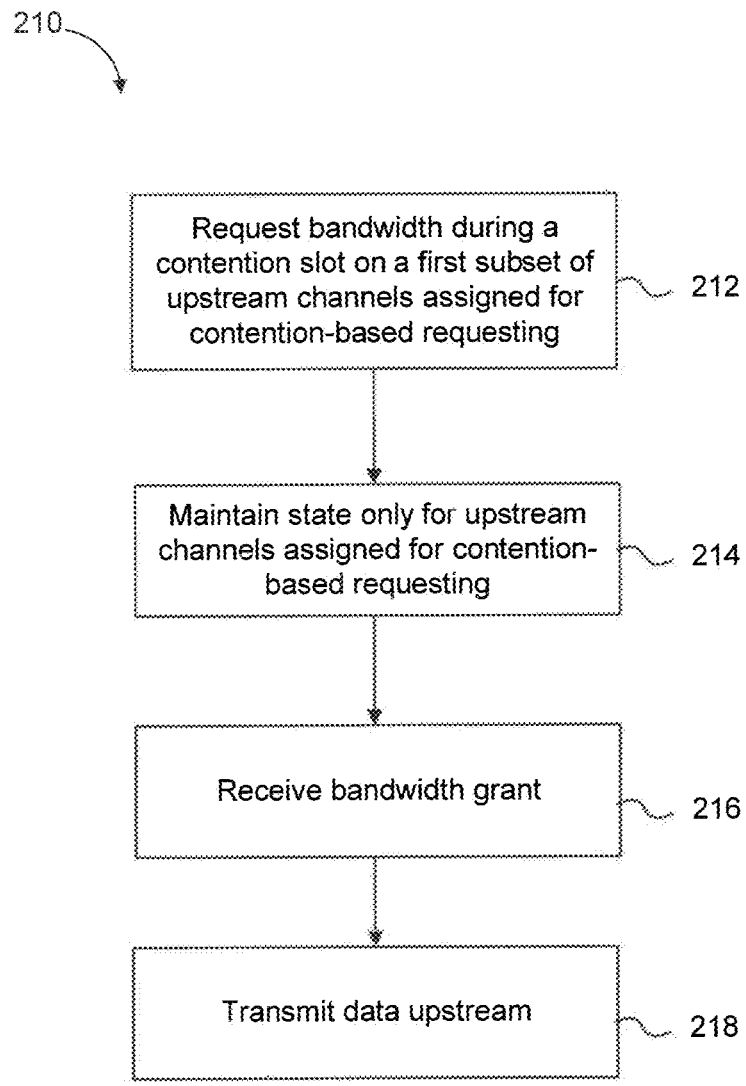
FIG. 2B is a flowchart of an exemplary process for limited contention-based requesting according to an embodiment of the disclosure.

FIG. 2B is a flowchart of an exemplary process 210 for limited contention-based requesting as performed by a cable modem, according to an embodiment of the disclosure. Process 210 will be described with continued reference to the example operating environment depicted in FIGS. 1-2. However, the process is not limited to that embodiment. Note that some steps shown in process 210 do not necessarily have to occur in the order shown. In an example, the steps are performed by a cable modem 104.

In step 212, bandwidth is requested during a contention slot on a first subset of upstream channels assigned for contention-based requesting. For example, bandwidth is requested on upstream channels 202 that are assigned for contention-based requesting.

In step 214, state is maintained only for the first subset of upstream channels assigned for contention-based requesting. For example, state 150 is maintained for each of the first subset of upstream channels 202.

In step 216, a bandwidth grant is received. For example, a bandwidth grant is received from CMTS 102 in response to the bandwidth request sent in step 212.

In step 218, data is transmitted upstream based on the bandwidth received in step 216. For example, data is transmitted over either the second subset of upstream channels 204 or over both the first subset of upstream channels 202 and the second set of upstream channels 204 to CMTS 102 based on the bandwidth grant received from the CMTS in step 216.

Stateless Requesting

In a further example, to overcome the problems described above with respect to scaling upstream bonding, according to an embodiment of the disclosure, cable modems 104 and the CMTS 102 can implement "stateless" requesting. In "stateless requesting" as described herein, a cable modem 104 does not store or update a state cycle 150 for a service flow that is provisioned for stateless requesting. The cable modem 104 no longer needs to store a time at which each request for bandwidth is transmitted, a time at which an acknowledgement is received, the upstream channel on which each request was made, the time of a request, how much bandwidth is requested, which channel the bandwidth is requested on, how much bandwidth was granted, or a time at which a bandwidth grant was received and on which channel it was received. In an example, CMTS 102 may store and update state cycle 150 along with the upstream channel on which each request was made, the time of a request, how much bandwidth is requested, which channel the bandwidth is requested on and how much bandwidth was granted for each flow and each upstream channel of each cable modem 104 provisioned for stateless requesting.

Figure 3A:
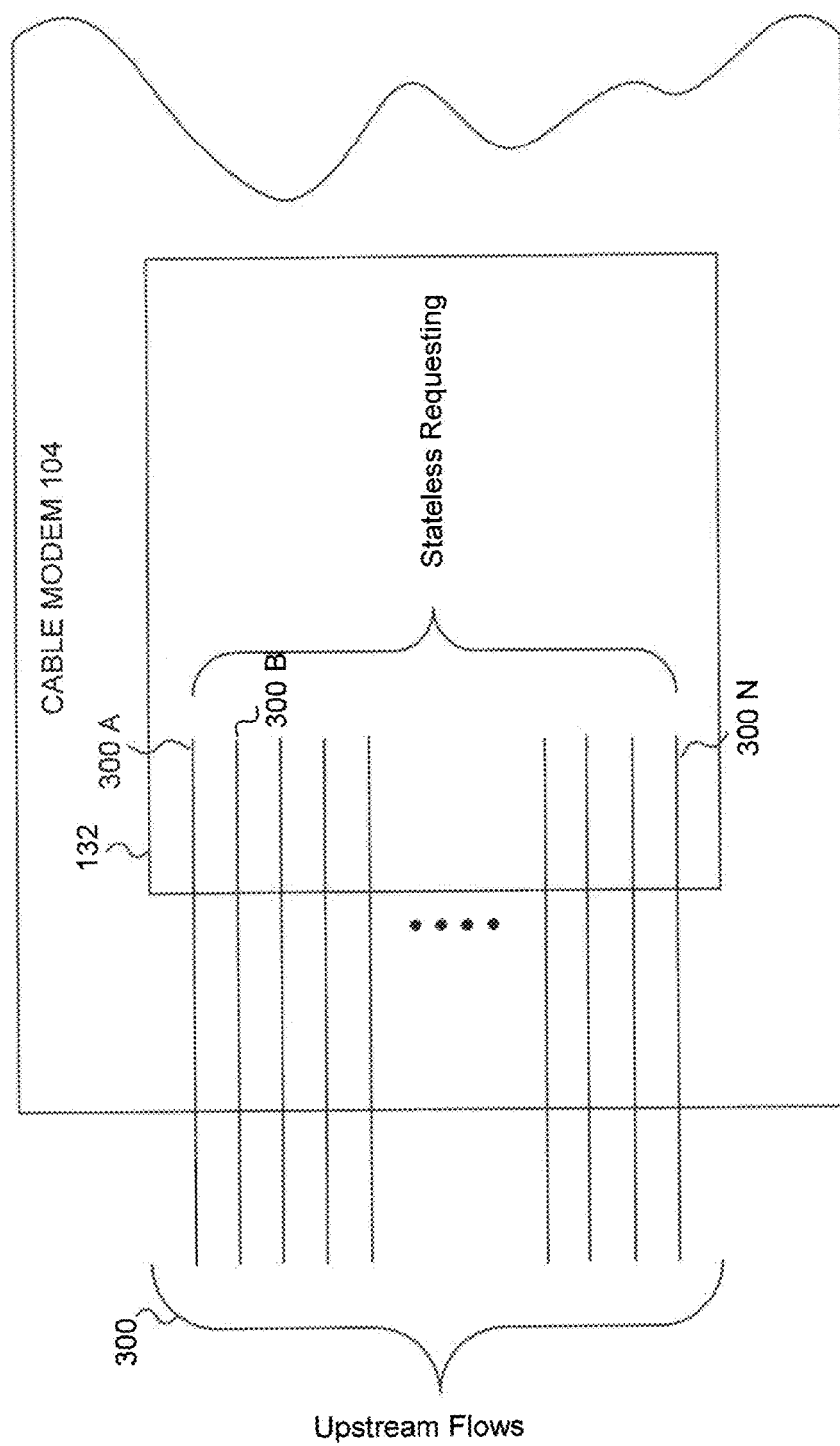
FIG. 3A illustrates stateless requesting according to an embodiment of the disclosure.

FIG. 3A illustrates stateless requesting. In the present example, flows 300a-n are referred to as "stateless flows." Stateless flows as referred to herein are upstream flows that implement stateless requesting. For example, stateless flow 300a may be a voice flow, stateless flow 300b may be a data flow etc. It is to be appreciated that a stateless flow, such as stateless flow 300a, may transmit over multiple upstream channels such as channels 200. As such, a stateless flow is a logical construct and should not be confused with a channel which is a frequency that may be used for communication. A stateless flow uses one or more channels for transmission. In an example, referring back to FIG. 1, in stateless requesting, bandwidth allocator 116 may periodically transmit a unicast poll to cable modems 104. In another example, bandwidth allocator 116 may assign contention slots to cable modems 104 during which they may request bandwidth. Bandwidth requestor 144 may determine a queue depth of an upstream queue 138. PHY 132 transmits the determined queue depth to CMTS 102. Bandwidth allocator 116 allocates bandwidth to the cable modem 104 based on the received queue depth. The bandwidth is transmitted in the form of a bandwidth grant via downstream PHY modulator 124.

As stated above, in stateless requesting, a cable modem 104 does not store a state cycle 150 for stateless flows 300, the time of a bandwidth request, the amount of bandwidth requested, which channel the bandwidth was requested on and whether a grant was received from the cable modem termination system for the requested bandwidth.

In an embodiment, whenever the cable modem has an opportunity to send its queue depth to CMTS 102, it sends the current value of the queue depth at that moment, without keeping track of what queue depth value was sent previously to CMTS 102. In contrast, conventional state-based systems keep track of the queue depth previously sent to CMTS 102.

In an example, any DOCSIS flow may be provisioned as a stateless flow except an Unsolicited Grant Service (UGS)

flow or an Unsolicited Grant Service Activity Detect (non-UGS-AD) flow. This is because UGS and UGS-AD flows may operate in a stateless fashion without being provisioned as such. In an example, stateless flows include all types of flows in a DOCSIS system except flows that require real-time or non-real-time polling.

In an example, in stateless requesting there is no contention-based requesting. DOCSIS also has unicast polling and it is possible to turn off contention requesting in a DOCSIS modem via a Request/Transmission Policy. So, to perform stateless requesting in DOCSIS, contention requesting may have to be disabled and, for example, bandwidth allocator 116 would send unicast polls to each cable modem 104 on a periodic basis. A cable modem 104 would respond to a poll by reporting the amount of data in the upstream queue 138 for a flow at the moment the request is being sent. In DOCSIS 3.0, the cable modem 104 has to keep track of whether it has previously requested bandwidth for data in an upstream queue 138, to ensure that it does not request for the same data twice, unless a request was lost. In stateless requesting, the cable modem 104 simply reports current queue depth of an upstream queue 138, without regard for what it previously reported.

When CMTS 102 receives the request from the cable modem 104, the CMTS 102 can determine the time of the request. CMTS 102 tracks whether it has already given a grant to the flow requesting bandwidth that started after the time of the request. These would be grants that were outstanding but not yet used at the time of the request. Subtracting the outstanding/unused grants from the queue depth in the request tells the CMTS 102 how much more it would need to grant the flow to empty its queue. The CMTS 102 may grant any portion of this or none at all based on needs of competing service flows, QoS associated with a requesting flow and a service level agreement associated with a cable modem 104. Stateless requesting also lessens the burden for CMTS 102 since it does not need to send a "grant pending" to inform a cable modem 104 that its request was heard and will get granted eventually.

With stateless requesting, all request/grant tracking associated with maintaining a state 150 by a cable modem 104 is eliminated, which greatly simplifies operation of the cable modem 104. The CMTS 102 may have to keep track of outstanding but unused grants. In an example, CMTS 102 may not keep track but then it might grant cable modems more bandwidth than they actually need. However, the CMTS no longer needs to send grants pending in MAP messages to modems, as it does in DOCSIS 3.0. Thus, the CMTS may have about the same amount of information to track as it does under convention DOCSIS 3.0 requirements. Thus the complexity of CMTS 102 is approximately unchanged, but the complexity of the modem 104 is greatly reduced.

Figure 3B:
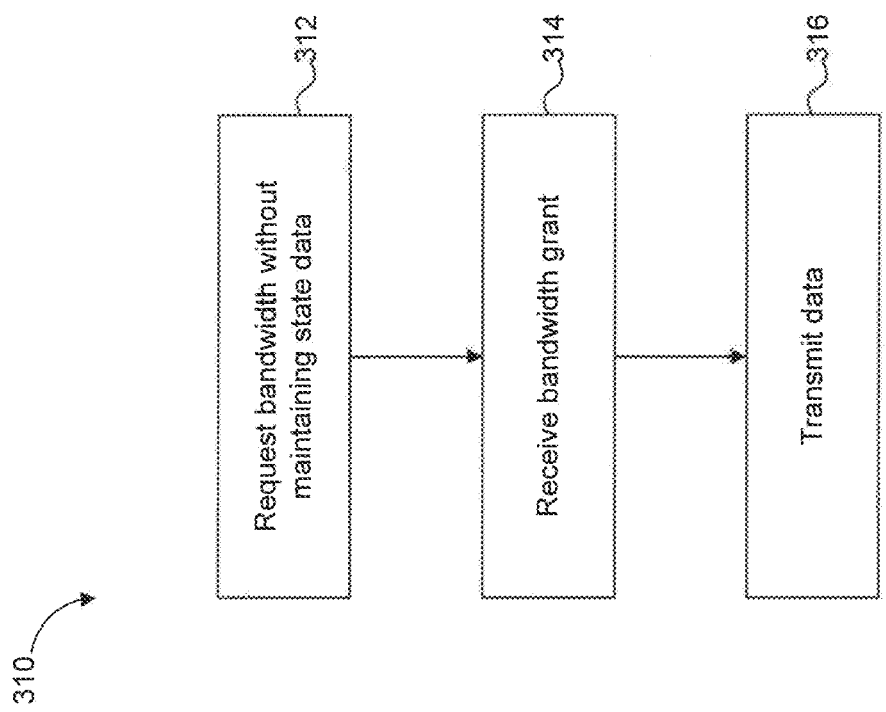
FIG. 3B is a flowchart of an exemplary process for stateless according to an embodiment of the disclosure.

FIG. 3B is a flowchart of an exemplary process 310 for stateless requesting as performed by a cable modem, according to an embodiment of the disclosure. Process 310 will be described with continued reference to the example operating environment depicted in FIGS. 1 and 3. However, the process is not limited to these embodiments. Note that some steps shown in process 310 do not necessarily have to occur in the order shown. In an example, the steps are performed by a cable modem 104.

In step 312, bandwidth is requested without storing or maintaining a state cycle. For example, bandwidth is requested on any of upstream channels 300 without maintaining a state cycle 150 for any of the channels. Bandwidth may be requested by transmitting a queue depth to the CMTS 102.

In step 314, a bandwidth grant is received. For example, a bandwidth grant is received from CMTS 102 based on the request in step 312.

In step 316, the data is transmitted to the CMTS based on the bandwidth grant received in step 314. For example, data is transmitted over one or more of stateless upstream channels 300 to CMTS 102.

Limited Contention-Based and Stateless Requesting

In an embodiment a cable modem 104 may support both limited contention-based and stateless requesting. Contention-based requesting as described above may be implemented on a limited set of upstream channels as described above. Stateless requesting as described above may involve stateless flows that request bandwidth when given an opportunity over contention-based channels or by other means (such as unicast polling.)

Figure 4:
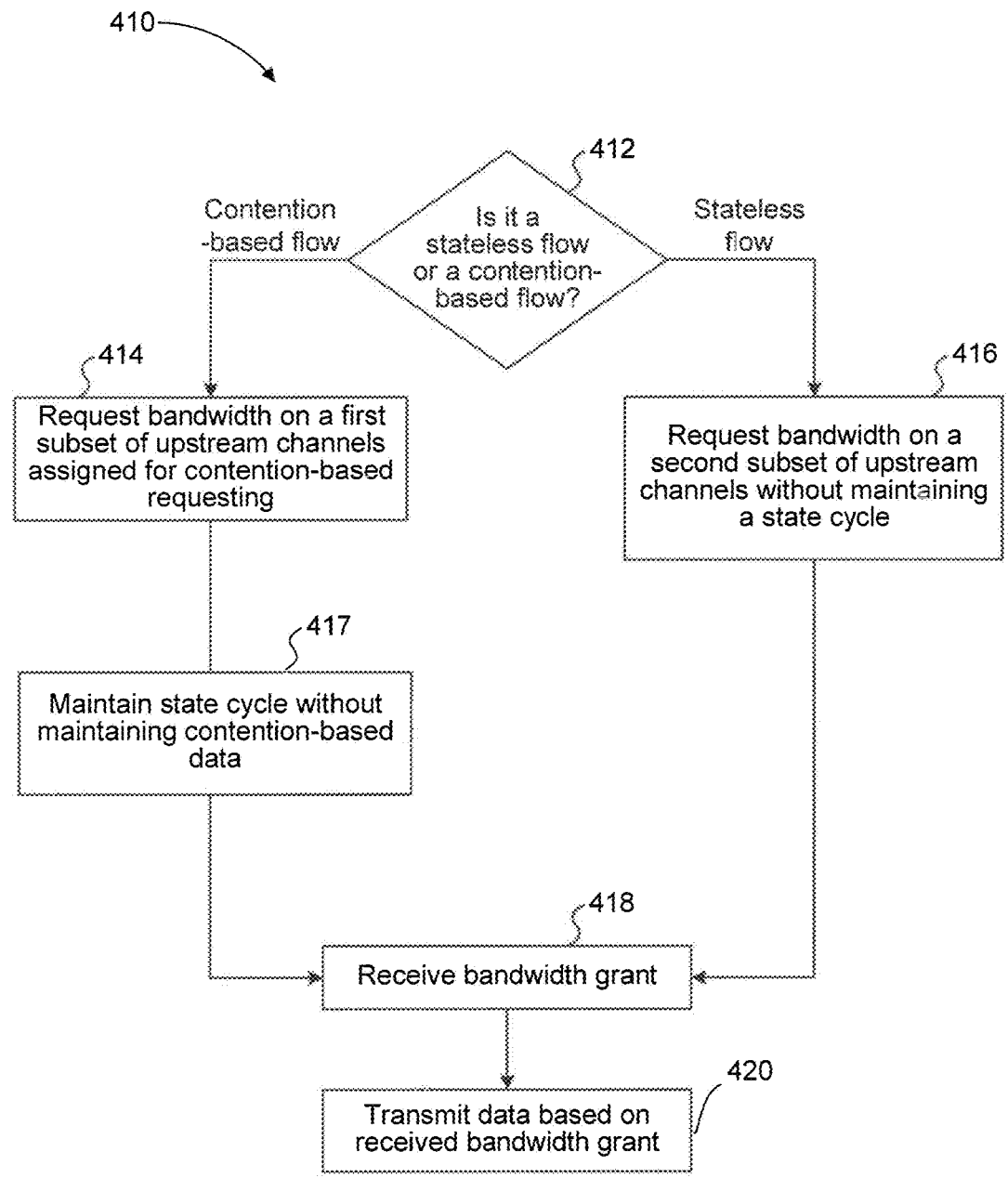
FIG. 4 is a flowchart of an exemplary process for stateless and limited contention-based requesting according to an embodiment of the disclosure.

FIG. 4 is a flowchart of an exemplary process 410 for stateless and limited contention-based requesting as performed by a cable modem, according to an embodiment of the disclosure. Process 410 will be described with continued reference to the example operating environment depicted in FIG. 1. However, the process is not limited to these embodiments. Note that some steps shown in process 410 do not necessarily have to occur in the order shown. In an example, the steps are performed by bandwidth requestor 144.

In step 412, it is determined whether a flow is provisioned as a stateless or limited contention-based flow. For example, bandwidth requestor 144 determines whether the flow is a contention-based flow or a stateless flow by a CMTS 102. If the flow is a stateless flow, the process proceeds to step 416. If the flow is a limited contention-based flow, the process proceeds to step 414. A flow may be provisioned by a cable operator via CMTS 102 or based on instructions stored in memory 142 of the cable modem 102.

In step 414, bandwidth is requested on a first subset of channels provisioned for limited contention-based requesting. For example, bandwidth is requested on upstream channels that are provisioned for contention-based requesting by requesting bandwidth during contention slots assigned by CMTS 102 and maintaining state cycle 150.

In step 417, no contention-based information is maintained for the channels that use contention-based requesting. However state information such as state cycle 150 is maintained for all channels, whether they are contention-based or not contention-based.

In step 416, bandwidth is requested for the stateless flow without maintaining a state cycle for the stateless flow. For example, bandwidth is requested on stateless flows which are provisioned for stateless requesting without maintaining state cycle 150 for those flows.

In step 418, a bandwidth grant is received. For example, a bandwidth grant is received from CMTS 102 based on the request in either step 414 or 416.

In step 420, data is transmitted to the CMTS based on the bandwidth grant received in step 418. For example, data is transmitted over state-based upstream channels 402 or stateless upstream channels 404 to CMTS 102.

In an example, stateless requesting may be used with contention regions. However, the contention regions would have to be managed differently than they are in conventional DOCSIS. This is because with stateless requesting, by definition the modem is not keeping track of its previous requests, so the cable modem has no way to know whether its requests have been heard.

In an example, a modem may use stateless requesting, but may still be able to do contention-based requesting for at least one flow, or a small number of flows. For instance, the cable modem 104 might need to operate like a conventional DOCSIS cable modem during initialization, until the CMTS is able to determine the version of the modem and determine whether the cable modem is capable of stateless requesting. In another example, it might be necessary for a cable modem to communicate with an earlier version of CMTS. In this case, limiting total number of channels for contention-based could be used for contention-capable flows only. For instance, this new modem might be capable of contention requesting on a single channel only, for a single service flow.

In an embodiment, during startup, cable modem 104 may be in operation as a stateless cable modem, a limited contention-based cable modem or a combination of a limited contention-based and a stateless cable modem. In an embodiment, CMTS 102 supports both limited contention-based and stateless cable modems. For example, CMTS 102 may assign contention time slots for limited contention-based service flows while supporting stateless service flows as well. Cable modem 104 may respond on limited contention-based channels 204 for contention time slots if it is configured to operate in a limited contention-mode for certain service flows. Cable modem 104 may respond to unicast polls from CMTS 102 if it is configured to operate in stateless mode. In another example, a cable modem 102 may be configured to operate in both limited contention-based and stateless modes.

Figure 5:
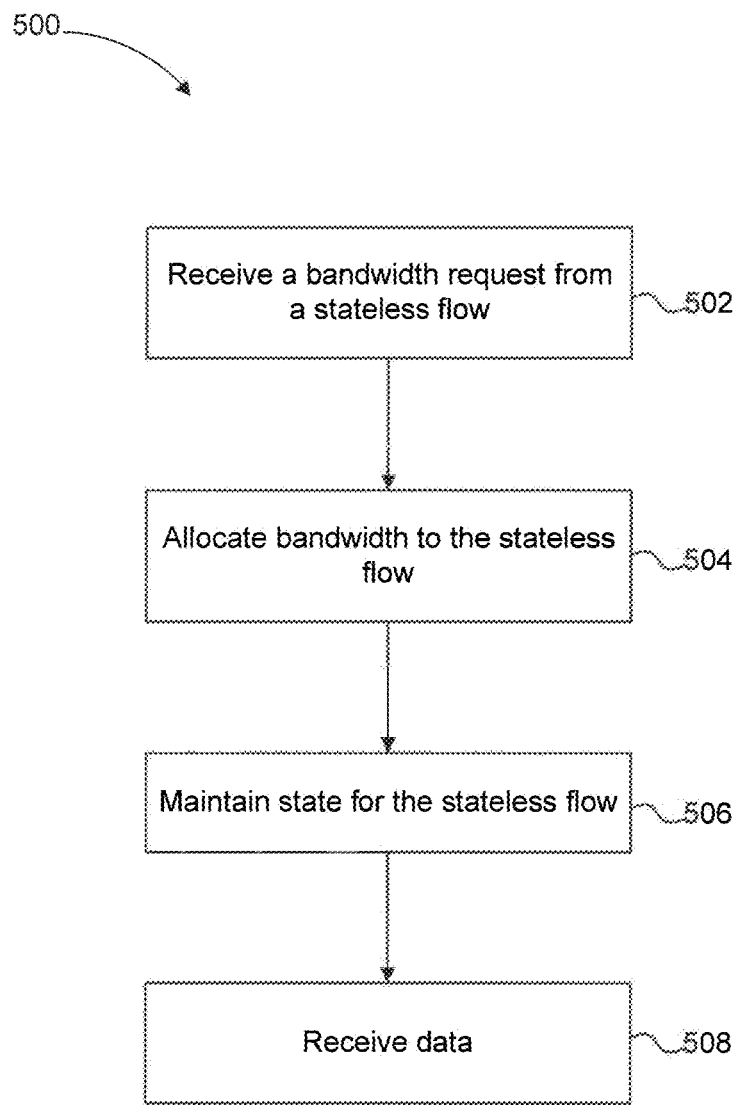
FIG. 5 is a flowchart of a process for allocating bandwidth to cable modems utilizing stateless flows, according to an embodiment of the disclosure.

FIG. 5 is a flowchart of a process 500 as performed by a CMTS for allocating bandwidth to cable modems utilizing stateless flows, according to an embodiment of the disclosure. Process 500 will be described with continued reference to the example operating environment depicted in FIGS. 1-4. However, the process is not limited to these embodiments. Note that some steps of process 500 do not necessarily have to occur in the order shown. In an example, the steps are performed by bandwidth allocator 116.

In step 502, a bandwidth request corresponding to a stateless flow is received. For example, bandwidth allocator 116 receives a bandwidth request corresponding to a stateless flow.

In step 504, the bandwidth is allocated based on the bandwidth request received in step 502. For example, bandwidth allocator 116 may receive a bandwidth request that includes a queue depth from a cable modem 104 and allocate bandwidth based on the received queue depth.

In step 506, state is maintained for the stateless flow. For example, bandwidth allocator 116 maintains a state 150 corresponding to the stateless flow of cable modem 104 that generated the bandwidth request in step 502.

In step 508, data is received. For example, data is received from the cable modem in response to the bandwidth granted in step 506.

Figure 6A:
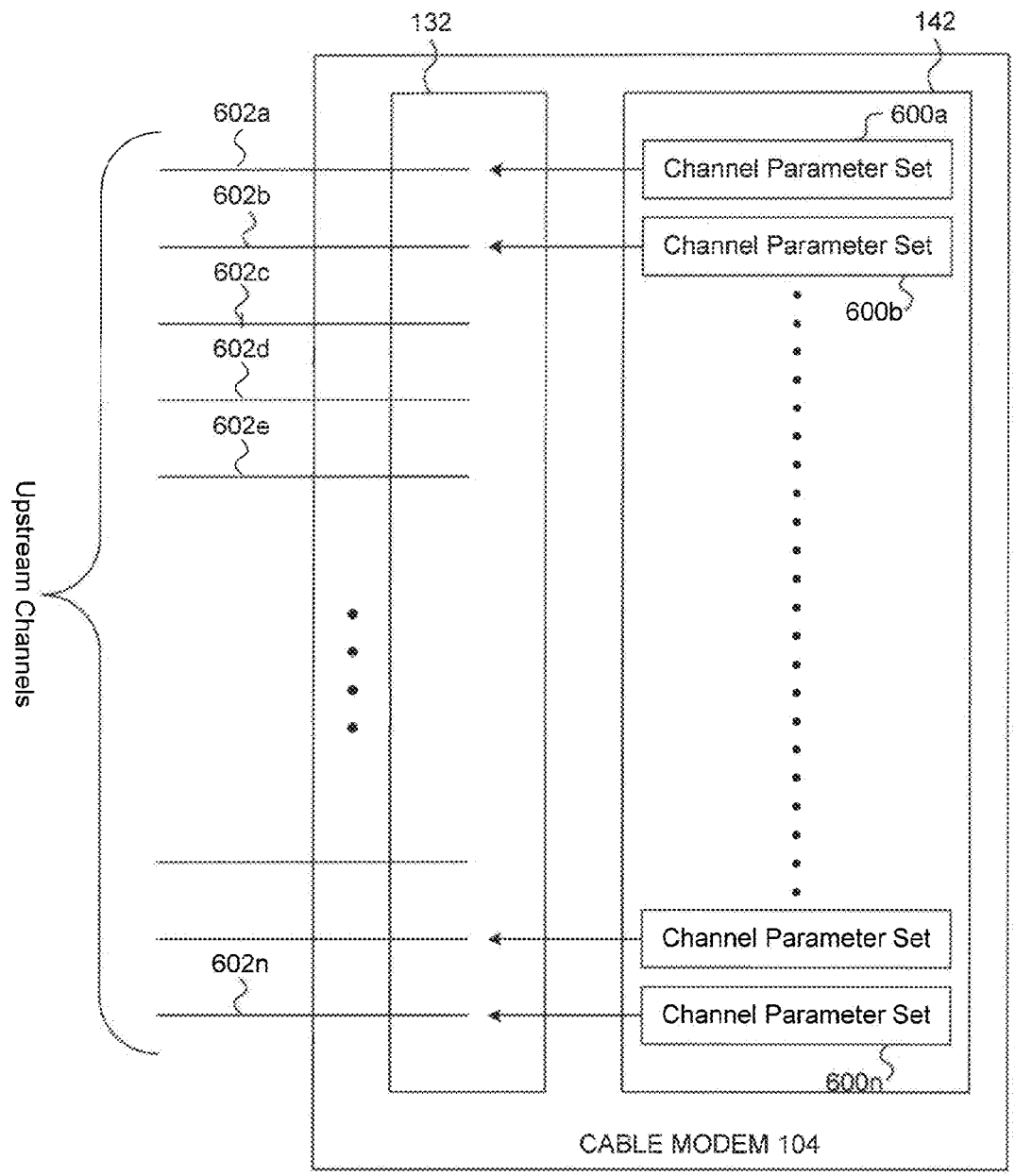
FIG. 6A illustrates an example of channel parameter sets.

Thus, the above examples with respect to FIGS. 1-5 provide solutions for upward scaling of upstream channels that reduce complexity and simultaneously save memory space. Sharing of parameter sets as described below with respect to FIGS. 6A-B provide further saving in memory space.

Shared Channel Parameter Sets

In conventional DOCSIS systems, each upstream channel of a cable modem 104 is associated with a channel parameter set. A "channel parameter set" as referred to herein may include at least one of a physical layer (PHY) parameters, a modulation rate, a preamble and a Forward Error Correction (FEC) code etc. and is used to define a data rate of an upstream channel. FIG. 6A illustrates an example of channel parameter sets. In FIG. 6A, memory 142 stores channels parameter sets 600a-n corresponding to upstream channels 602a-n. However, as the number of upstream channels increases, the number of channel parameters sets, need to be stored for each upstream channel also increases. Memory 142 in a cable modem 104 may be a limited resource. Accordingly, embodiments presented herein offer solutions to minimize the number of channel parameter sets thereby saving limited memory space.

Figure 6B:
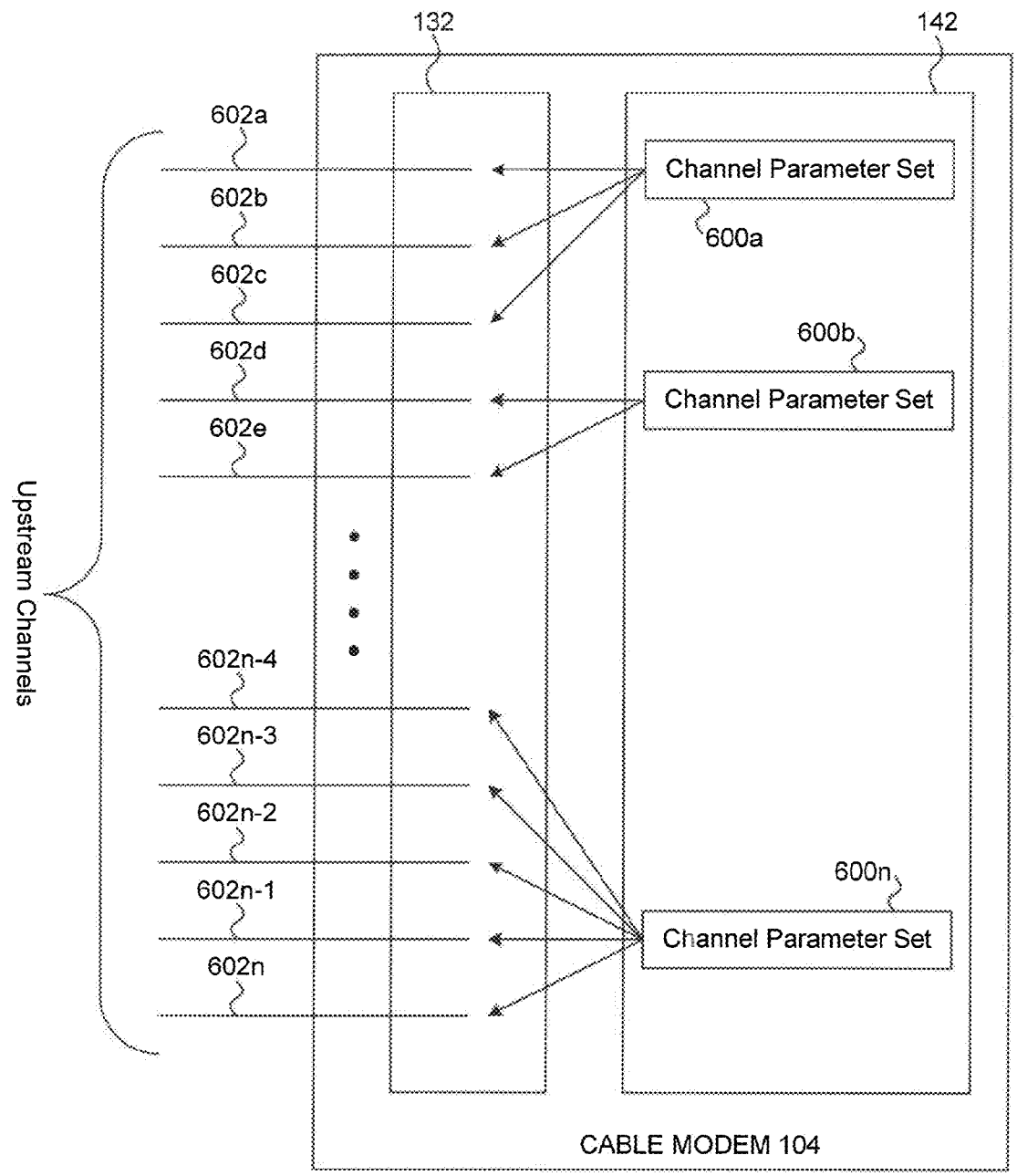
FIG. 6B illustrates shared channel parameter sets according to an embodiment of the disclosure.

FIG. 6B illustrates shared channel parameter sets according to an embodiment of the disclosure. In FIG. 6B, channel parameter set 600a is used by channels 602a-c, channel parameter set 600b is used by channels 602d-e and channel parameter set 600n is shared by channels 602n-4 to 602n. Upstream channels 602 that have substantially similar SNR ratios within pre-determined thresholds are associated with a corresponding channel parameter set 142 by, for example, MAC 136 or processor 140. Currently, DOCSIS requires that each upstream channel 602 be associated with its own channel parameter set 600. By sharing channel parameter sets 600 as described herein, substantial savings in memory 142 can be realized as the number of upstream channels 602 scales upwards.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Example General Purpose Computer System

Embodiments presented herein, or portions thereof, can be implemented in hardware, firmware, software, and/or combinations thereof.

The embodiments presented herein apply to any communication system between two or more devices or within sub-components of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 7:
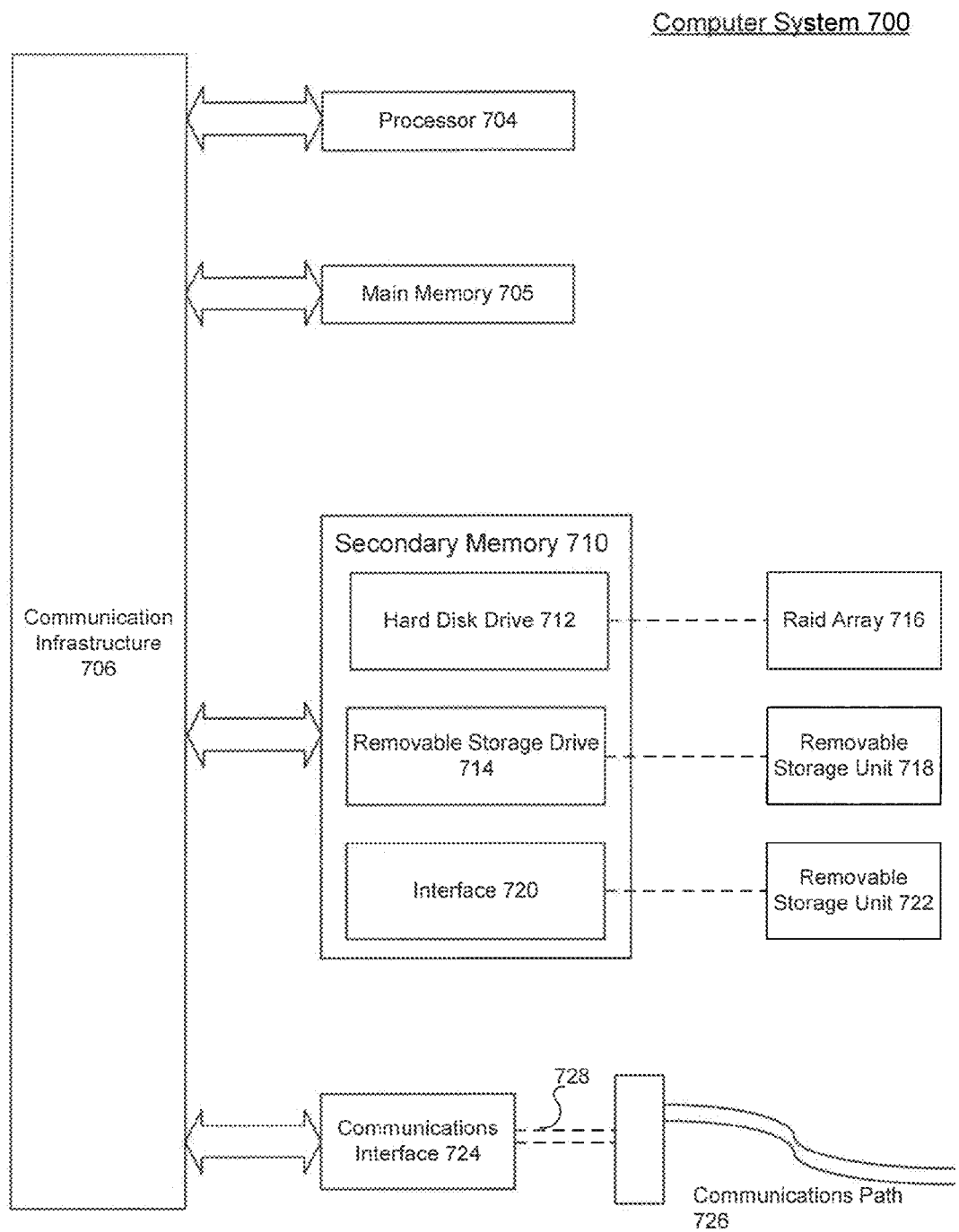
FIG. 7 is a block diagram of an exemplary computer system on which the present invention can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 700 is shown in FIG. 7. The computer system 700 includes one or more processors, such as processor 704. Processor 704 can be a special purpose or a general purpose digital signal processor. The processor 704 is connected to a communication infrastructure 706 (for example, a bus or network). Various software implementations are described in terms of this exemplary computer system. After reading this description, it will become apparent to a person skilled in the relevant art how to implement the disclosure using other computer systems and/or computer architectures.

Computer system 700 also includes a main memory 705, preferably random access memory (RAM), and may also include a secondary memory 710. The secondary memory 710 may include, for example, a hard disk drive 712, and/or a RAID array 716, and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. As will be appreciated, the removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path 726. Communications path 726 carries signals 728 and may be implemented using wire or cable, fiber optics, a phone line, a cellular phone link, an RF link and other communications channels.

The terms "computer program medium" and "computer usable medium" are used herein to generally refer to media such as removable storage drive 714, a hard disk installed in hard disk drive 712, and signals 728. These computer program products are means for providing software to computer system 700.

Computer programs (also called computer control logic) are stored in main memory 705 and/or secondary memory 710. Computer programs may also be received via communications interface 724. Such computer programs, when executed, enable the computer system 700 to implement the present disclosure as discussed herein. In particular, the computer programs, when executed, enable the processor 704 to implement the processes of the present disclosure. For example, when executed, the computer programs enable processor 704 to implement part of or all of the steps described above with reference to the flowcharts herein. Where the disclosure is implemented using software, the software may be stored in a computer program product and loaded into computer system 700 using raid array 716, removable storage drive 714, hard drive 712 or communications interface 724.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

CONCLUSION

While various embodiments have been described above, it should be understood that they have been presented by way of example, and not limitation. It will be apparent to persons skilled in the relevant art that various charges in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A cable modem, comprising:
   a physical layer (PHY) configured to communicate over a plurality of upstream channels; and
   a bandwidth requestor configured to:
      generate a first request for a first allocation of bandwidth using contention-based requesting over a first subset of upstream channels of the plurality of upstream channels for contention-based flows,
      generate a second request for a second allocation of bandwidth using stateless requesting over a second subset of upstream channels of the plurality of upstream channels for stateless flows, and
      not store and not update a state cycle to track the second request for the stateless flows.

2. The cable modem of claim 1, wherein the first subset of upstream channels and the second subset of upstream channels are disjoint.

3. The cable modem of claim 1, wherein the bandwidth requestor is further configured to store and update the state cycle to track the first request for contention-based flows.

4. The cable modem of claim 1, wherein the bandwidth requestor is further configured to calculate and to store contention-based data for the first subset of upstream channels.

5. The cable modem of claim 1, wherein the bandwidth requestor is configured to request the first allocation of bandwidth only during assigned contention time slots for the contention-based requesting.

6. The cable modem of claim 1, wherein the bandwidth requestor is further configured to not maintain the state cycle for the stateless flows in the stateless requesting, and wherein the state cycle is maintained by a Cable Modem Termination System (CMTS) for the stateless flows in the stateless requesting.

7. The cable modem of claim 1, wherein the stateless flows comprise: flows except for flows that require real-time or non-real-time polling.

8. The cable modem of claim 1, wherein the bandwidth requestor is configured to not store, for the stateless flows, a time at which a request for bandwidth is transmitted, a time at which an acknowledgement is received, an upstream channel of the second subset of upstream channels on which the request for bandwidth is transmitted, an amount of bandwidth requested, an amount of bandwidth that is granted, a time at which a bandwidth grant is received, or a channel on which the bandwidth grant is received.

9. The cable modem of claim 1, wherein the bandwidth requestor is further configured to receive a unicast poll from a Cable Modem Termination System (CMTS) and to respond with an upstream queue depth.

10. A method in a cable modem, comprising:
generating a first request for a first allocation of bandwidth using contention-based requesting over a first subset of upstream channels for contention-based flows;
generating a second request for a second allocation of bandwidth using stateless requesting over a second subset of the upstream channels for stateless flows; and
not storing and not updating a state cycle to track the second request for the stateless flows.

11. The method of claim 10, wherein the first subset of upstream channels and the second subset of upstream channels are disjoint.

12. The method of claim 10, further comprising:
storing and updating the state cycle to track bandwidth requests for the first subset of upstream channels and not for the second subset of upstream channels.

13. The method of claim 10, further comprising:
calculating and storing contention-based data for the first subset of upstream channels.

14. The method of claim 10, further comprising:
requesting the first allocation of bandwidth only during assigned contention time slots for contention-based requesting.

15. The method of claim 10, further comprising:
not maintaining the state cycle for the stateless flows in the stateless requesting.

16. The method of claim 10, wherein the stateless flows include all types of flows except for flows that require real-time or non-real-time polling.

17. The method of claim 10, further comprising:
not storing, for the stateless flows, a time at which a request for bandwidth is transmitted, a time at which an acknowledgement is received, an upstream channel of the second subset of upstream channels on which the request for bandwidth is transmitted, an amount of bandwidth requested, an amount of bandwidth that is granted, a time at which a bandwidth grant is received, or a channel on which the bandwidth grant is received.

18. The method of claim 10, further comprising:
receiving a unicast poll from a Cable Modem Termination System (CMTS); and
responding with an upstream queue depth.

19. A cable modem, comprising:
a memory configured to store instructions; and
a processor coupled to the memory, the processor configured to, based on the instructions stored in the memory:
generate a first request for a first allocation of bandwidth using contention-based requesting over a first subset of upstream channels for contention-based flows;
generate a second request for a second allocation of bandwidth using stateless requesting over a second subset of the upstream channels for stateless flows; and
not store and not update a state cycle to track the second request for the stateless flows.

20. The cable modem of claim 19, wherein the first subset of upstream channels and the second subset of upstream channels are disjoint.

* * * * *